(12) United States Patent
Suh

(10) Patent No.: US 11,983,024 B2
(45) Date of Patent: May 14, 2024

(54) SYSTEM COMPRISING ROBUST OPTIMAL DISTURBANCE OBSERVER FOR HIGH-PRECISION POSITION CONTROL PERFORMED BY ELECTRONIC DEVICE, AND CONTROL METHOD THEREFOR

(71) Applicant: GANGNEUNG-WONJU NATIONAL UNIVERSITY INDUSTRY ACADEMY COOPERATION GROUP, Gangneung-si (KR)

(72) Inventor: Sang Min Suh, Seoul (KR)

(73) Assignee: GANGNEUNG-WONJU NATIONAL UNIVERSITY INDUSTRY ACADEMY COOPERATION GROUP, Gangneung-si (KR)

( * ) Notice: Subject to any disclaimer, the term of this patent is extended or adjusted under 35 U.S.C. 154(b) by 73 days.

(21) Appl. No.: 18/037,924

(22) PCT Filed: Nov. 16, 2021

(86) PCT No.: PCT/KR2021/016697
§ 371 (c)(1),
(2) Date: May 19, 2023

(87) PCT Pub. No.: WO2022/108287
PCT Pub. Date: May 27, 2022

(65) Prior Publication Data
US 2023/0324931 A1 Oct. 12, 2023

(30) Foreign Application Priority Data
Nov. 20, 2020 (KR) .................. 10-2020-0156700

(51) Int. Cl.
G05D 3/12 (2006.01)
G05B 13/02 (2006.01)
(Continued)

(52) U.S. Cl.
CPC ............... $G05D\ 3/12$ (2013.01); $G05B\ 13/02$ (2013.01); $G05B\ 13/04$ (2013.01); $G05B\ 19/19$ (2013.01)

(58) Field of Classification Search
None
See application file for complete search history.

(56) References Cited

U.S. PATENT DOCUMENTS 5,511,930 A * 4/1996 Sato ................. G05B 19/19
700/304
6,584,367 B1 * 6/2003 Makino ............. G05B 19/195
700/60
(Continued)

FOREIGN PATENT DOCUMENTS

KR 10-2375355 B1 3/2022

OTHER PUBLICATIONS

Eom et al., "Disturbance observer based path tracking control of robot manipulator considering torque saturation", Mar. 1999, Mechatronics 11 (2001) 325±343. (Year: 1999).*

(Continued)

Primary Examiner — Mohammad Ali
Assistant Examiner — Kelvin Booker
(74) Attorney, Agent, or Firm — NSIP Law

(57) ABSTRACT

Disclosed is a system comprising: a plant (P) to be controlled; a controller (C); a first weight function (W1); a second weight function (W2); and a disturbance observer, wherein the first weight function (W1) receives a difference value between a disturbance (w) and an output ($u_{DO}$) of the disturbance observer as an input value, the second weight function (W2) receives a difference value between the output value of the controller (C) and the output ($u_{DO}$) of the disturbance observer as an input value, the plant (P) to be controlled receives, as an input value, the sum value of the (Continued)

disturbance (w) and the difference value between the output value of the controller (C) and the output ($u_{DO}$) of the disturbance observer, and the controller (C) receives an output value of the plant (P) to be controlled as an input value.

5 Claims, 15 Drawing Sheets

(51) Int. Cl.
*G05B 13/04* (2006.01)
*G05B 19/19* (2006.01)

(56) References Cited

U.S. PATENT DOCUMENTS

| | | | | |
|---|---|---|---|---|
| 6,745,087 B2* | 6/2004 | Shah | | G05B 17/02 700/29 |
| 7,020,539 B1* | 3/2006 | Kovacevic | | B22F 10/66 700/98 |
| 8,060,340 B2* | 11/2011 | Gao | | G05B 13/04 702/182 |
| 11,717,966 B2* | 8/2023 | Saadat Dehghan | | B25J 13/085 700/254 |
| 2002/0099475 A1* | 7/2002 | Spangler | | G05B 19/19 700/60 |
| 2002/0101253 A1* | 8/2002 | Pletner | | F16F 15/005 324/727 |
| 2003/0028266 A1* | 2/2003 | Jacques | | G05B 5/01 700/32 |
| 2003/0040818 A1* | 2/2003 | Pletner | | G03F 7/709 700/60 |
| 2003/0097193 A1* | 5/2003 | Makino | | G05B 5/01 700/59 |
| 2004/0194565 A1* | 10/2004 | Okada | | H01L 21/67709 74/111 |
| 2007/0205184 A1* | 9/2007 | Mazumder | | B23P 23/04 219/121.84 |
| 2008/0065240 A1* | 3/2008 | Takaishi | | G11B 5/59688 |
| 2009/0005886 A1* | 1/2009 | Gao | | G05B 13/02 700/29 |
| 2009/0222109 A1* | 9/2009 | Takagi | | G03F 7/70725 700/44 |
| 2010/0014184 A1* | 1/2010 | Takaishi | | G11B 5/5547 360/75 |
| 2010/0268354 A1* | 10/2010 | Takaishi | | G11B 5/596 700/56 |
| 2012/0283850 A1* | 11/2012 | Gao | | G05B 13/048 700/45 |

OTHER PUBLICATIONS

Gao et al., "A Novel Motion Control Design Approach Based On Active Disturbance Rejection", Dec. 2001, Proceedings of the 40th IEEE Conference on Decision and Control. (Year: 2001).*

Eom et al., "Disturbance Observer Based Force Control of Robot Manipulator without Force Sensor", May 1998, Proceedings of the 1998 IEEE International Conference on Robotics & Automation Leuven, Belgium. (Year: 1998).*

Saiki et al., "Positioning of Large-Scale High Precision Viscoelastic Stage Based on Vibration Suppression PTC", 2009, IEEE. (Year: 2009).*

Kim et al., "Optimal Disturbance Observer Design for High Tracking Performance in Motion Control Systems", Aug. 2020, Mathematics 2020, 8, 1633 ; doi:10.3390/math8091633. (Year: 2020).*

Kim et al., "Disturbance-Observer-Based Position Tracking Controller in the Presence of Biased Sinusoidal Disturbance for Electrohydraulic Actuators", Apr. 2012, IEEE Transactions on Control Systems Technology, vol. 21, No. 6. (Year: 2012).*

Yang et al., "Controlling the Transition From Stable Resting to Tracking Control of an Unstable System", Jun. 2002, Journal of Dynamic Systems, Measurement, and Control, vol. 124. (Year: 2002).*

Suh, S.M., "Unified H00 Control to Suppress Vertices of Plant Input and Output Sensitivity Functions", Feb. 2008, IEEE Transactions on Control Systems Technology, vol. 18, No. 4, Jul. 2010. (Year: 2008).*

Suh, S., "Estimation Error Based Disturbance Observer Design for Flexible Loop Shaping", Oct. 2018, Electronics 2018, 7, 358; doi:10.3390/electronics7120358. (Year: 2018).*

Yang et al., "A Novel Robust Nonlinear Motion Controller With Disturbance Observer", Apr. 2005, IEEE Transactions on Control Systems Technology, vol. 16, No. 1, Jan. 2008. (Year: 2005).*

Yoon et al., "Application of a Disturbance Observer for a Relative Position Control System", Feb. 2009, IEEE Transactions on Industry Applications, vol. 46, No. 2, Mar./Apr. 2010. (Year: 2009).*

Choi et al., "Design of Robust High-Speed Motion Controller for a Plant With Actuator Saturation", Sep. 2000, Journal of Dynamic Systems, Measurement, and Control Sep. 2000, vol. 122. (Year: 2000).*

Korean Office Action dated Dec. 13, 2021 in corresponding Korean Patent Application No. 10-2020-0156700 (2 pages in English, 5 pages in Korean).

Kim, Wonhee, and Sangmin Suh. "Suboptimal Disturbance Observer Design Using All Stabilizing Q Filter for Precise Tracking Control." *Mathematics* 8.9 (Aug. 26, 2020): 1434.

Korean Patent Decision dated Feb. 18, 2022 in corresponding Korean Patent Application No. 10-2020-0156700 (2 pages in English, 2 pages in Korean).

* cited by examiner

Nominal model with C

SYSTEM COMPRISING ROBUST OPTIMAL DISTURBANCE OBSERVER FOR HIGH-PRECISION POSITION CONTROL PERFORMED BY ELECTRONIC DEVICE, AND CONTROL METHOD THEREFOR

CROSS REFERENCE TO RELATED APPLICATIONS

This application is a U.S. National Stage Application of International Application No. PCT/KR2021/016697, filed on Nov. 16, 2021, which claims the benefit under 35 USC 119(a) and 365(b) of Korean Patent Application No. 10-2020-0156700, filed on Nov. 20, 2020, in the Korean Intellectual Property Office, the entire disclosure of which is incorporated herein by reference for all purposes.

ACKNOWLEDGEMENT

This technology was supported by the MSIT (Ministry of Science and ICT), Korea, under the Innovative Human Resource Development for Local Intellectualization support program (IITP-2023-RS-2023-0026 0267) supervised by the IITP (Institute for Information & communication Technology Planning & Evaluation).

[Research and Development Identification Number] 1711198468

[Research and Development Number] 00260267

[Ministry] MSIT (Ministry of Science and ICT)

[Research Management Institution] IITP (Institute for Information & communication Technology Planning & Evaluation)

[Research Project Name] Innovative Human Resource Development for Information & communication Technology

[Research Project Title] Innovative Human Resource Development for Local Intellectualization (Kangwon National University)

[Contribution Rate] 1/1

[Research Institution] KNU-Industry Cooperation Foundation, Gangneung-Wonju National University Industry Academy Cooperation Group

[Research Period] Jul. 1, 2023~Dec. 31, 2023.

BACKGROUND

Technical Field

The present disclosure relates to a system including a robust optimal disturbance observer for high-precision position control performed by an electronic device, and a control method therefor.

Background Art

Designing a controller that can be stably driven all the time with desired performance is one of the goals to be considered in designing a control system. Furthermore, when designing a control system, compensating for variations and uncertainty of a plant caused by errors in the manufacturing process also need to be considered.

Such a control system can be applied to various driving devices, and, specifically, can be applied to inspection equipment used in the manufacture of semiconductors and displays and to unmanned aerial vehicles such as drones, medical devices such as genetic testing machines, etc.

However, in the case of conventional control systems, a controller is designed by a trial-and-error method for the high-precision position/velocity control, and the designed controller is frequently driven unstably because the stability thereof is not guaranteed.

In addition, in the case of the existing design method, tolerances in the manufacturing process are not taken into account. Therefore, driving devices need to be precisely manufactured, and there is a problem that performance of a control system is greatly influenced by errors of the driving devices.

SUMMARY

The purpose of the present disclosure is to provide a system including a robust optimal disturbance observer for high-precision position control performed by an electronic device, and a control method therefor.

The purposes of the present disclosure are not limited to the above-mentioned purpose, and, by the following description, other purposes that have not been mentioned will be clearly understood by a person having ordinary skills in the art.

There may be provided the system including the robust optimal disturbance observer for high-precision position control performed by the electronic device according to an aspect of the present disclosure for achieving the above-mentioned purpose, including: a plant P to be controlled; a controller C; a first weight function W1; a second weight function W2; and a disturbance observer, wherein the first weight function W1 may receive a difference value between a disturbance w and an output $u_{DO}$ of the disturbance observer as an input value, the second weight function W2 may receive a difference value between an output value of the controller C and the output $u_{DO}$ of the disturbance observer as an input value, the plant P to be controlled may receive, as an input value, a sum value of the disturbance w and the difference value between the output value of the controller C and the output $u_{DO}$ of the disturbance observer, and the controller C may receive an output value of the plant P to be controlled as an input value.

Other specific details of the present disclosure are included in the detailed description and drawings.

It may be possible that the control system designed according to the various embodiments of the present disclosure described above minimizes disturbances, stabilizes the system, and has robustness.

The effects of the present disclosure are not limited to the above-mentioned effect, and, by the following description, other effects that have not been mentioned will be clearly understood by a person having ordinary skills in the art.

DESCRIPTION OF EXEMPLARY EMBODIMENTS

Figure 1:
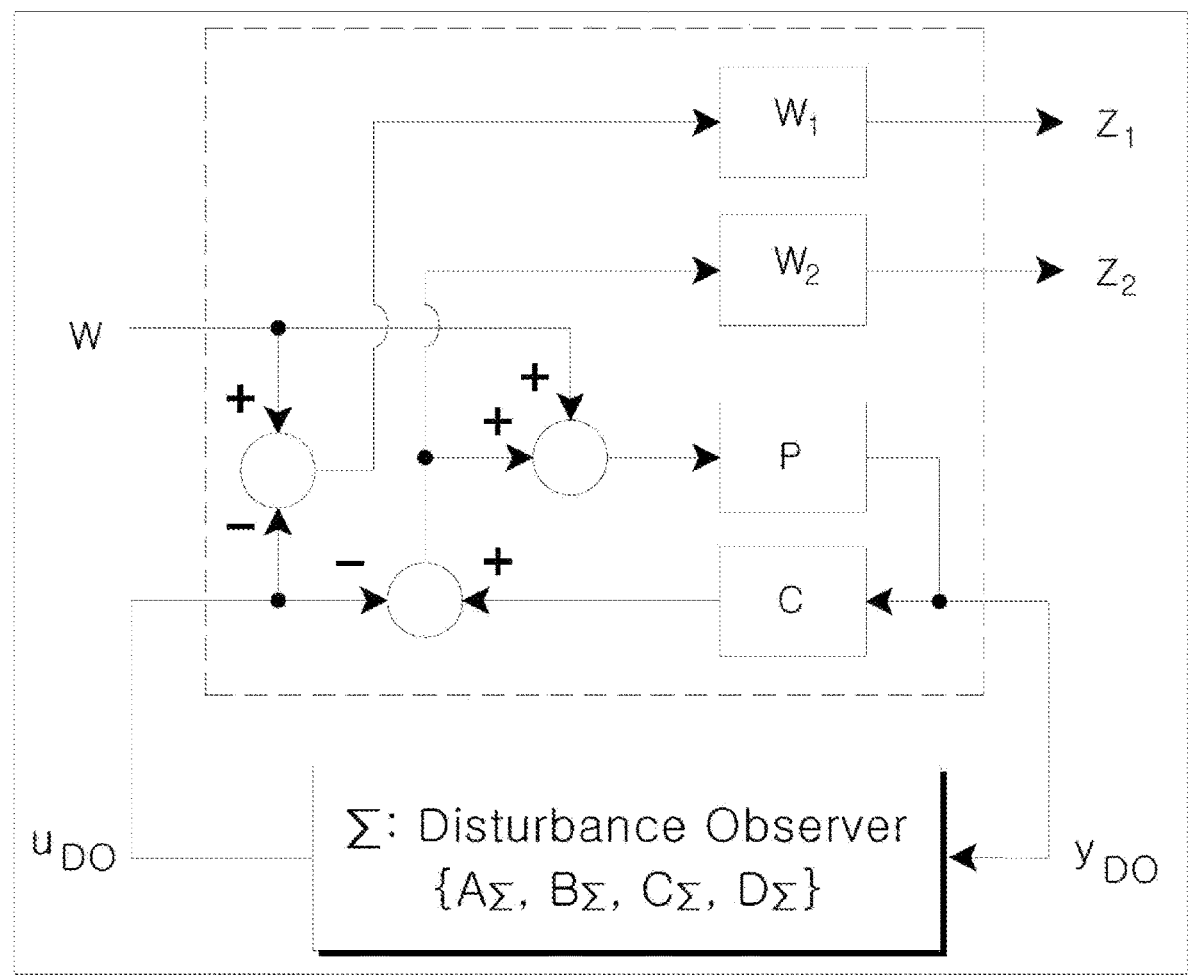
FIG. 1 is a block diagram illustrating a system including a robust optimal disturbance observer for high-precision position control according to an embodiment of the present disclosure.

Advantages and characteristics of the present disclosure and methods for achieving them will become clear with reference to the embodiments described below in detail with the accompanying drawings. However, the present disclosure is not limited to the embodiments disclosed below and may be implemented in a variety of different forms, the embodiments are provided only to make the present disclosure complete and to make a person having ordinary skills in the technical field to which the present disclosure belongs fully understand the scope of the present disclosure, and the present disclosure is only defined by the scope of the claims.

Terms used in this specification are for the purpose of describing the embodiments and are not intended to limit the present disclosure. In this specification, expressions in the singular form include the meaning of the plural form unless otherwise specified. The expression "comprises" and/or "comprising" as used herein does not exclude the presence or addition of one or more components other than the mentioned components. Throughout the specification, one particular reference number consistently refers to one particular component, and, by the expression "and/or," each of the mentioned components and all possible combinations thereof are included. Although expressions such as "first" and "second" are used to describe various components, it is needless to say that these components are not limited by these expressions. The expressions are only used to distinguish one component from another. Accordingly, it goes without saying that a first component mentioned below may also be a second component within the technology of the present disclosure.

Unless otherwise defined, all terms (including technical and scientific terms) used in this specification may have a meaning commonly understood by a person having ordinary skills in the technical field to which the present disclosure pertains. In addition, terms defined in commonly used dictionaries should not be interpreted ideally or excessively unless explicitly specifically defined.

The term "unit" or "module" used in this specification refers to software components and hardware components such as FPGA and ASIC, and the "units" or "modules" perform certain roles. However, the "units" or "modules" are not limited to software or hardware. The "units" or "modules" may be designed to be present in an addressable storage medium and may be designed to reproduce one or more processors. Therefore, for example, the "units" or "modules" include components such as software components, object-oriented software components, class components, task components and processes, functions, properties, procedures, subroutines, segments of a program code, drivers, firmware, microcode, circuitry, data, databases, data structures, tables, arrays, and variables. Functions provided by the components and the "units" or "modules" may be combined into a smaller number of components and "units" or "modules," or may be further separated into additional components and "units" or "modules."

Expressions such as "below," "beneath," "lower," "above," and "upper," which have spatially relative meanings, may be used to easily describe the relationship between one component and other components as shown in the drawings. It should be understood that the expressions having spatially relative meanings also refer to different directions of components that the components have when being used or operated in directions other than those shown in the drawings. For example, when a component shown in the drawings is flipped, that component that has been described as being "below" or "beneath" another component may be "above" the other component. Accordingly, the exemplary expression "below" may refer to both the directions below and above. The components can be oriented in other directions as well, so the expressions with spatially relative meanings can be interpreted according to the orientation.

In this specification, a computer refers to any type of hardware devices including at least one processor, and can be understood to also refer to software components operating in a corresponding hardware device according to an embodiment. For example, the computer can be understood to refer to all of a smartphone, a tablet PC, a desktop computer, a laptop computer, and user clients and applications running on each of these devices, and is not limited thereto.

Hereinafter, the embodiments of the present disclosure will be described in detail with reference to the accompanying drawings.

Each step described in this specification is described as being performed by a computer, but the subject of each step is not limited thereto. That is, according to the embodiments, at least a part of each step may be performed by a different device as well.

FIG. 1 is a block diagram illustrating a system including a robust optimal disturbance observer for high-precision position control according to an embodiment of the present disclosure.

In order to solve the existing problems, according to the present disclosure, a controller may be designed by designing a weight function for desired performance, a function in which errors due to uncertainty of a device to be driven are considered, and a nominal model as one model. Furthermore, the controller according to the present disclosure may be designed with an optimization method of a linear matrix inequality (LMI) so that the stability of the entire system is always guaranteed.

That is, in relation to a driving system, there are a problem that performance degradation occurs due to external disturbances and a problem that performance degradation is caused by uncertainty due to errors in the manufacturing process of a controlled object. Therefore, it may be possible to design a stabilized closed-loop system by designing the controller shown in FIG. 1.

Specifically, as shown in FIG. 1, the system according to an embodiment of the present disclosure may include a plant P to be controlled, a controller C, a first weight function W1, a second weight function W2, and a disturbance observer.

The first weight function W1 may receive a difference value between a disturbance w and an output $u_{DO}$ of the disturbance observer as an input value, the second weight function W2 may receive a difference value between an output value of the controller C and the output $u_{DO}$ of the disturbance observer as an input value, the plant P to be controlled may receive, as an input value, a sum value of the disturbance w and the difference value between the output value of the controller C and the output $u_{DO}$ of the disturbance observer, and the controller C may receive an output value of the plant P to be controlled as an input value.

When the controller is designed by the above-mentioned method, it may be possible that the disturbance observer always stabilizes the closed-loop system, (2) effectively removes disturbances, and (3) effectively works even when there is uncertainty due to errors in the manufacturing process of a model to be controlled.

In other words, as shown in FIG. 1, when the controller is designed based on the linear matrix inequality, it may be possible to match the output of the controller with the disturbance and to solve the problem caused by uncertainty.

Specifically, the first weight function W1 may be a weight function for minimizing the difference between the applied disturbance w and the output $u_{DO}$ of the disturbance observer based on the frequency characteristics of the plant P to be controlled, and the stability of the system may be improved by the first weight function.

Furthermore, the second weight function W2 may be a weight function for controlling the uncertainty of the plant P to be controlled, and, thanks to the second weight function, effective operation may be possible even in the presence of uncertainty due to errors in the manufacturing process of a model to be controlled.

That is, the disturbance observer according to an embodiment of the present disclosure may be formed based on the first weight function W1 and the second weight function W2, and, as described above, may improve the stability of the system by removing the disturbances and design a robust control model at the same time.

Meanwhile, according to an embodiment of the present disclosure, the plant P to be controlled, the controller C, the first weight function W1, and the second weight function W2 may be expressed by a state space expression as shown in Equation 1 below.

$$P: \begin{array}{l} \dot{x}_P(t) = A_P x_P(t) + B_P u_P(t) \\ y_P(t) = C_P x_P(t) \end{array} \quad \text{[Equation 1]}$$

$$C: \begin{array}{l} \dot{x}_C(t) = A_C x_C(t) + B_C u_C(t) \\ y_C(t) = C_C x_C(t) + D_C u_C(t) \end{array}$$

$$W_1: \begin{array}{l} \dot{x}_{W_1}(t) = A_{W_1} x_{W_1}(t) + B_{W_1} u_{W_1}(t) \\ y_{W_1}(t) = C_{W_1} x_{W_1}(t) + D_{W_1} u_{W_1}(t) \end{array}$$

$$W_2: \begin{array}{l} \dot{x}_{W_2}(t) = A_{W_2} x_{W_2}(t) + B_{W_2} u_{W_2}(t) \\ y_{W_2}(t) = C_{W_2} x_{W_2}(t) + D_{W_2} u_{W_2}(t) \end{array}$$

Here, as shown below, from the controller designed according to FIG. 1 and Equation 1, a state equation of the plant P to be controlled (Equation 2), a state equation of the controller C (Equation 3), and state equations of the first weight function W1 and the second weight function W2 (Equation 4) may be derived.

$$\dot{x}_P(t) = A_P x_P(t) + B_P u_P(t) \quad \text{[Equation 2]}$$
$$= A_P x_P(t) + B_P u_P(t) + C_C x_C(t) +$$
$$D_C C_P x_P(t) - u_{DO}(t))$$
$$= (A_P + B_P D_C C_P) x_P(t) + B_P C_C x_C(t) +$$
$$B_P w(t) - B_P u_{DO}(t).$$

$$\dot{x}_C(t) = A_C x_C(t) + B_C u_C(t) \quad \text{[Equation 3]}$$
$$= A_C x_C(t) + B_C C_P x_P(t)$$
$$= B_C C_P x_P(t) + A_C x_C(t).$$

$$\dot{x}_{W_1}(t) = A_{W_1} x_{W_1}(t) + B_{W_1}(w(t) - u_{DO}(t)) \quad \text{[Equation 4]}$$
$$= A_{W_1} x_{W_1}(t) + B_{W_1}\left(w(t) - B_{W_1} u_{DO}(t)\right)$$

$$\dot{x}_{W_2}(t) = A_{W_2} x_{W_2}(t) + B_{W_2}(C_C x_C(t) + D_C C_P x_P(t)) - u_{DO}(t))$$
$$= A_{W_2} x_{W_2}(t) + B_{W_2}(C_C x_C(t) + D_C C_P x_P(t)) - B_{W_2} u_{DO}(t))$$
$$= B_{W_2} D_C C_P x_P(t) + B_{W_2} C_C x_C(t) + A_{W_2} x_{W_2}(t) - B_{W_2} u_{DO}.$$

Meanwhile, based on Equations 1 to 4 above, it may be possible to obtain an output value z1 of the first weight function W1 and an output value z2 of the second weight function W2, which can be expressed by Equation 5 below.

$$z_1(t) = C_{W_1} x_{W_1}(t) + D_{W_1}(w(t) - u_{DO}(t)) \quad \text{[Equation 5]}$$
$$= C_{W_1} x_{W_1}(t) + D_{W_1} w(t) - D_{W_1} u_{DO}(t)),$$

$$z_2(t) = C_{W_2} x_{W_2}(t) + D_{W_2}(C_C x_C(t) + D_C C_P x_P(t) - u_{DO}(t))$$
$$= C_{W_2} x_{W_2}(t) + D_{W_2} C_C x_C(t) + D_{W_2} D_C C_P x_P(t) - D_{W_2} u_{DO}(t)$$
$$= D_{W_2} D_C C_P x_P(t) + D_{W_2} C_C x_C(t) + C_{W_2} x_{W_2}(t) - D_{W_2} u_{DO}.$$

Furthermore, state equations for an input and an output of the disturbance observer may be derived as in Equation 6 below, and, from Equations 1 to 5, the parameters shown in Equation 6 may be derived as in Equation 7.

$$\begin{array}{l} \dot{x}(t) = A x(t) + B_1 w(t) + B_2 u_{DO}(t) \\ z(t) = C_1 x(t) + D_{11} w(t) + D_{12} u_{DO}(t) \\ y_{DO}(t) = C_2 x(t) + D_{21} w(t) + D_{22} u_{DO}(t), \end{array} \quad \text{[Equation 6]}$$

$$x(t) = \left[ x_P^T(t) x_C^T(t) x_{W_1}^T(t) x_{W_1}^T(t) \right]^T, \quad \text{[Equation 7]}$$

$$A = \begin{bmatrix} A_P + B_P D_C C_P & B_P C_C & 0 & 0 \\ B_C C_P & A_C & 0 & 0 \\ 0 & 0 & A_{W_1} & 0 \\ B_{W_2} D_C C_P & B_{W_2} C_C & 0 & A_{W_2} \end{bmatrix}, B_1 = \begin{bmatrix} B_P \\ 0 \\ B_{W_1} \\ 0 \end{bmatrix}, B_2 = \begin{bmatrix} -B_P \\ 0 \\ -B_{W_1} \\ -B_{W_2} \end{bmatrix},$$

$$C_1 = \begin{bmatrix} 0 & 0 & C_{W_1} & 0 \\ D_{W_2} D_C C_P & D_{W_2} C_C & 0 & A_{W_2} \end{bmatrix}, D_{11} = \begin{bmatrix} D_{W_1} \\ 0 \end{bmatrix}, D_{12} = \begin{bmatrix} -D_{W_1} \\ -D_{W_2} \end{bmatrix},$$

$$C_2 = [C_P 0 0 0], D_{21} = 0, D_{22} = 0.$$

Then, by an electronic device 100, an optimized disturbance observer may be designed based on the output value z1 of the first weight function W1 and the output value z2 of the second weight function W2.

Figure 2A:
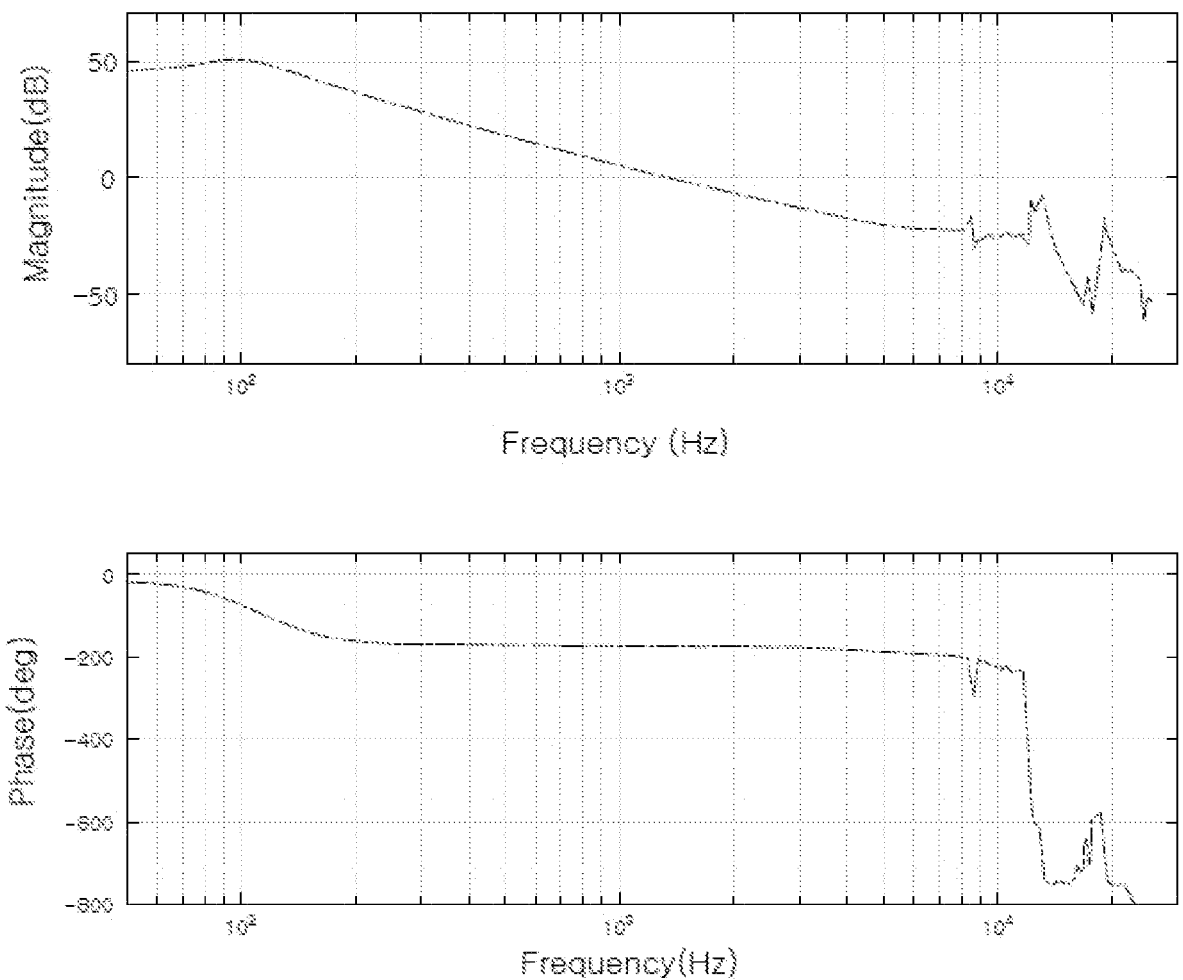
FIGS. 2A to 2C are exemplary views showing an example of frequency characteristics of a plant to be controlled according to an embodiment of the present disclosure.
Figure 2B:
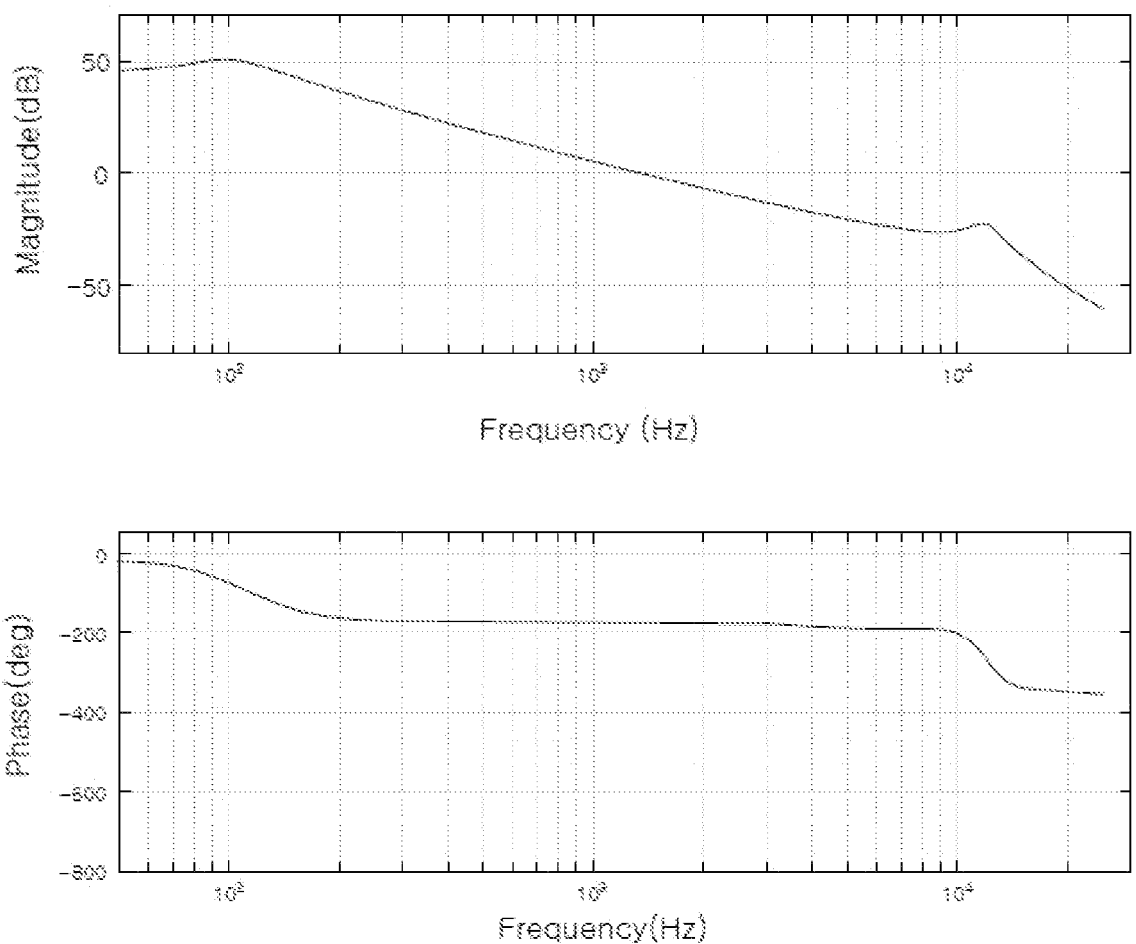
Figure 2C:
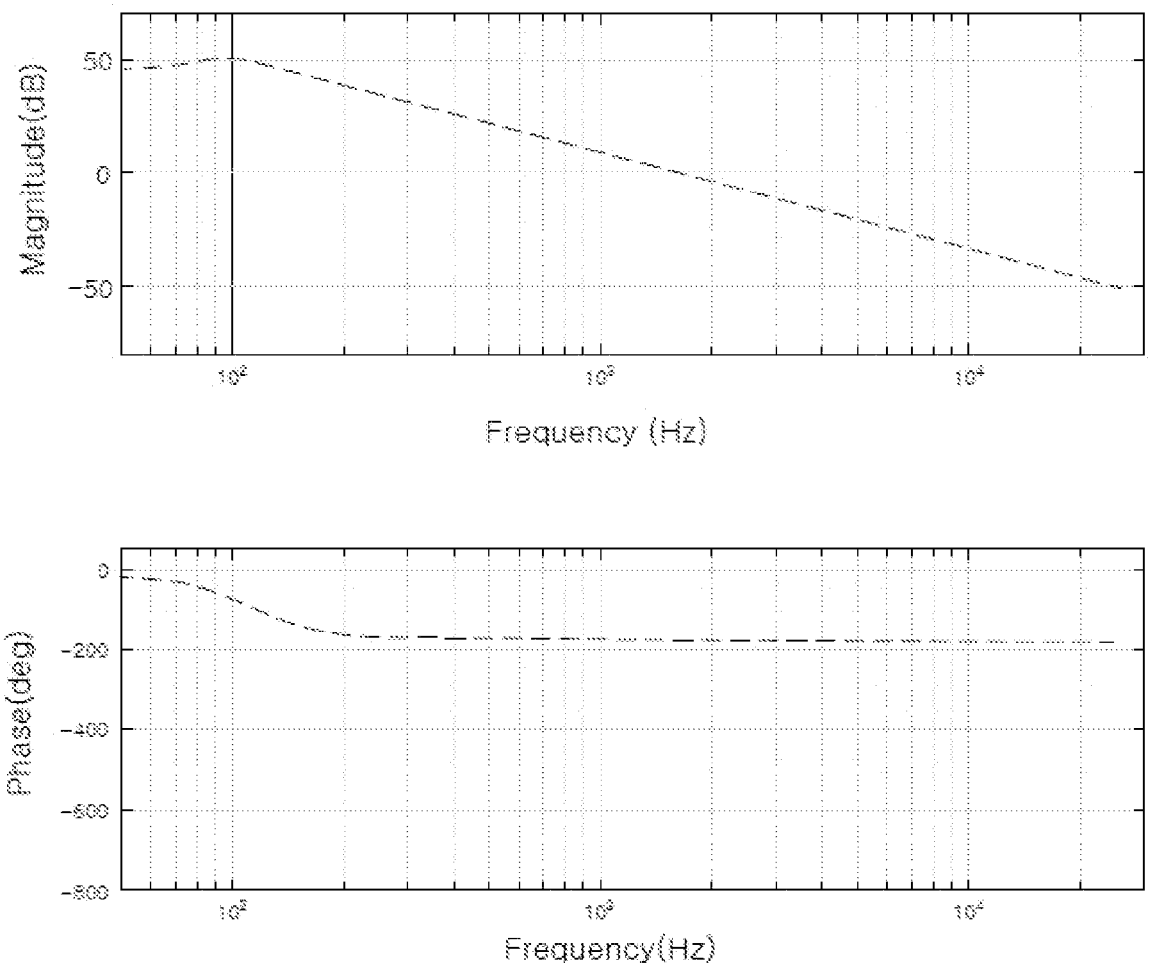
Figure 3:
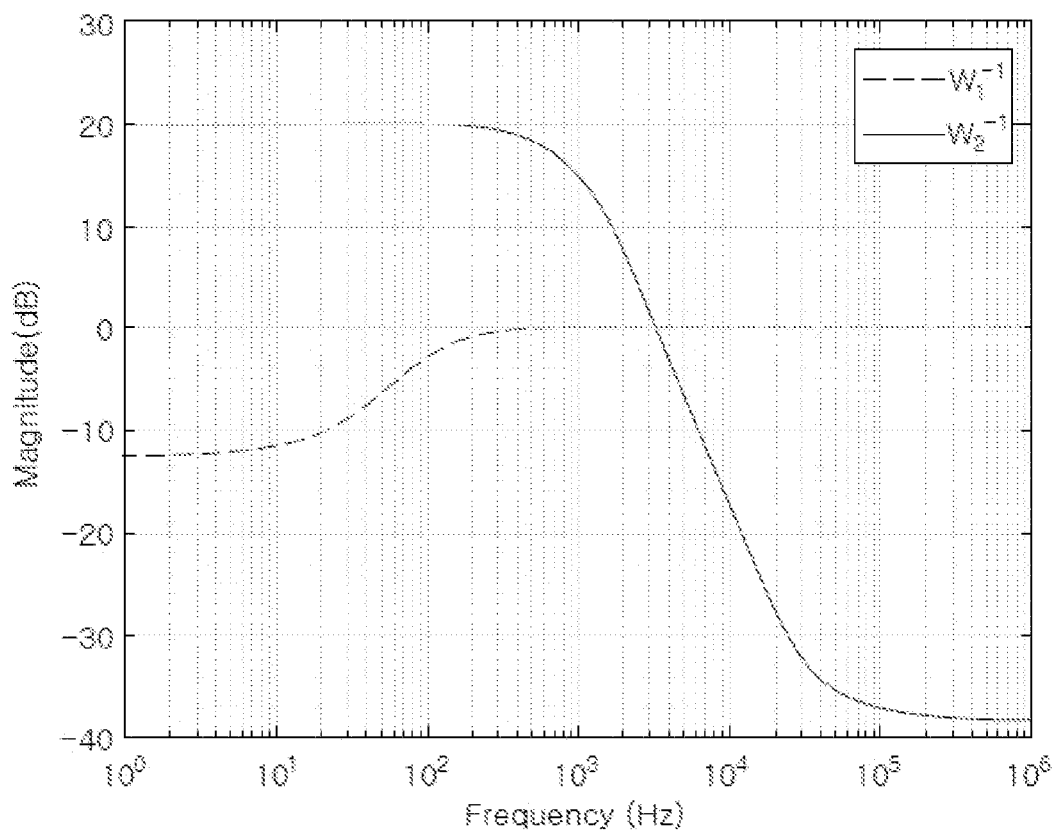
FIG. 3 is an exemplary view for explaining frequency characteristics of a first weight function and a second weight function according to an embodiment of the present disclosure.

Specifically, as shown in FIGS. 2A to 2C, the electronic device 100 may obtain the first weight function W1 and the second weight function W2 as shown in FIG. 3 based on the output value z1 of the first weight function W1 and the output value z2 of the second weight function W2 for the frequency characteristics of the plant P to be controlled, and may design the disturbance observer based on the acquired W1 and W2.

Figure 4:
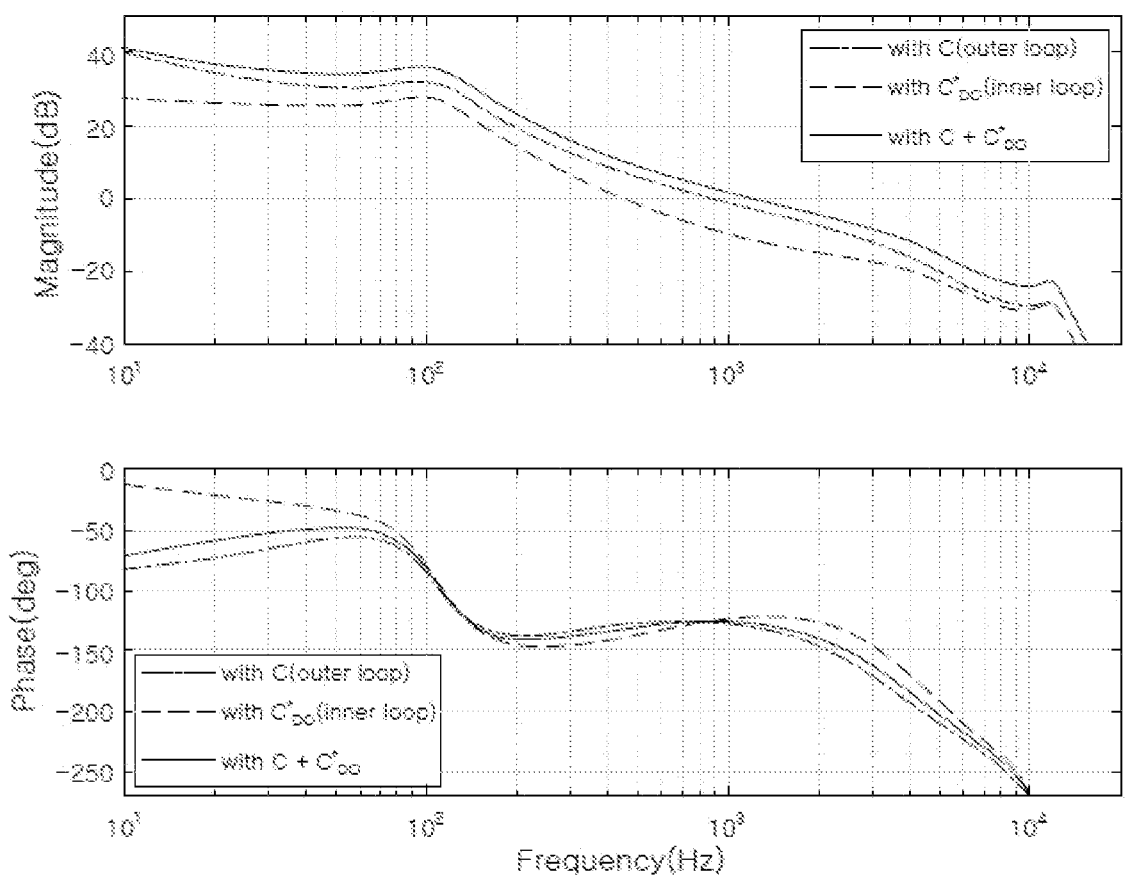
FIG. 4 is an exemplary view illustrating an open-loop transfer function of the system to which the first weight function and the second weight function according to an embodiment of the present disclosure have been applied.

To be specific, FIG. 4 is an exemplary diagram illustrating an open-loop transfer function of a system to which the first weight function and the second weight function according to an embodiment of the present disclosure have been applied.

It is seen that the open-loop transfer function of the control system where the designed disturbance observer ($C^*_{DO}$) is combined with the controller C is the most stable.

Figure 5:
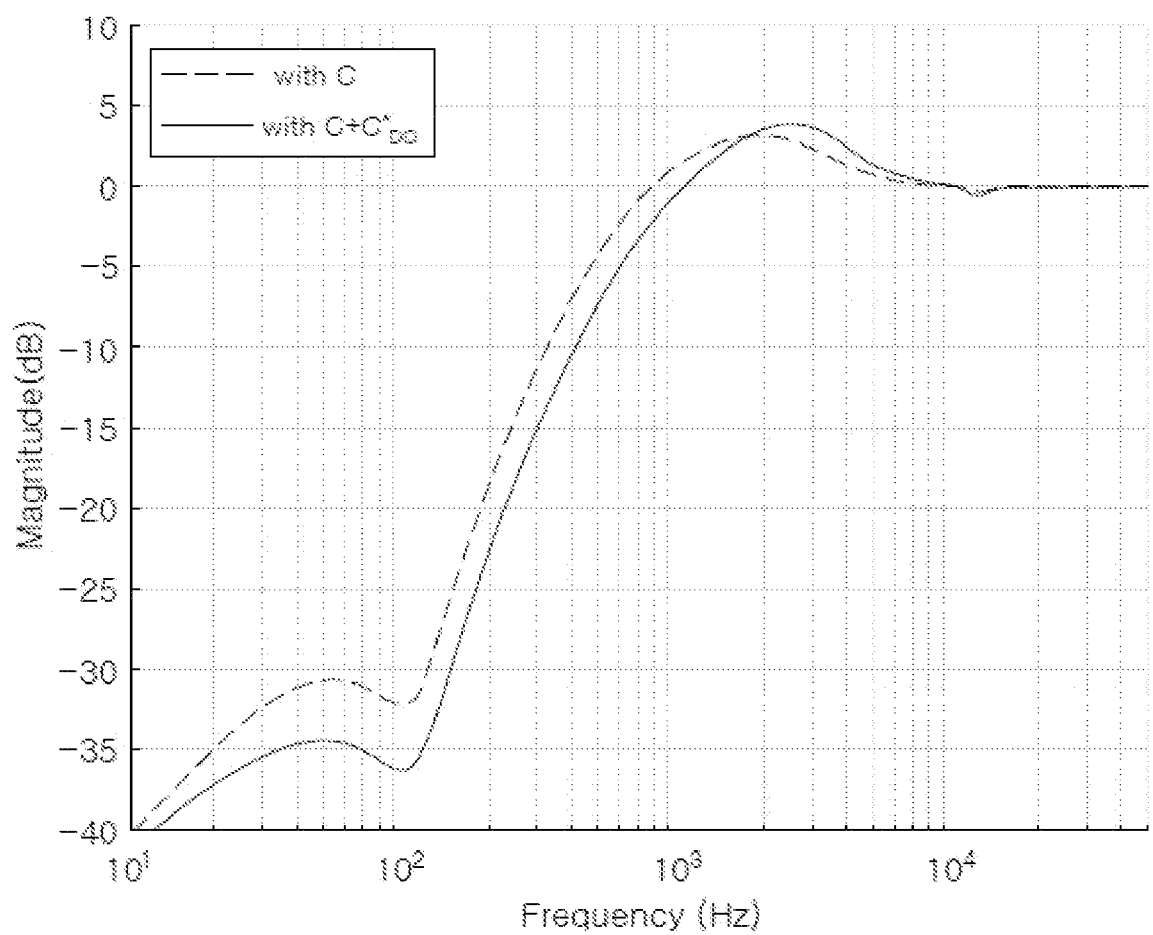
FIG. 5 is an exemplary view showing a sensitivity function according to an embodiment of the present disclosure.
Figure 6:
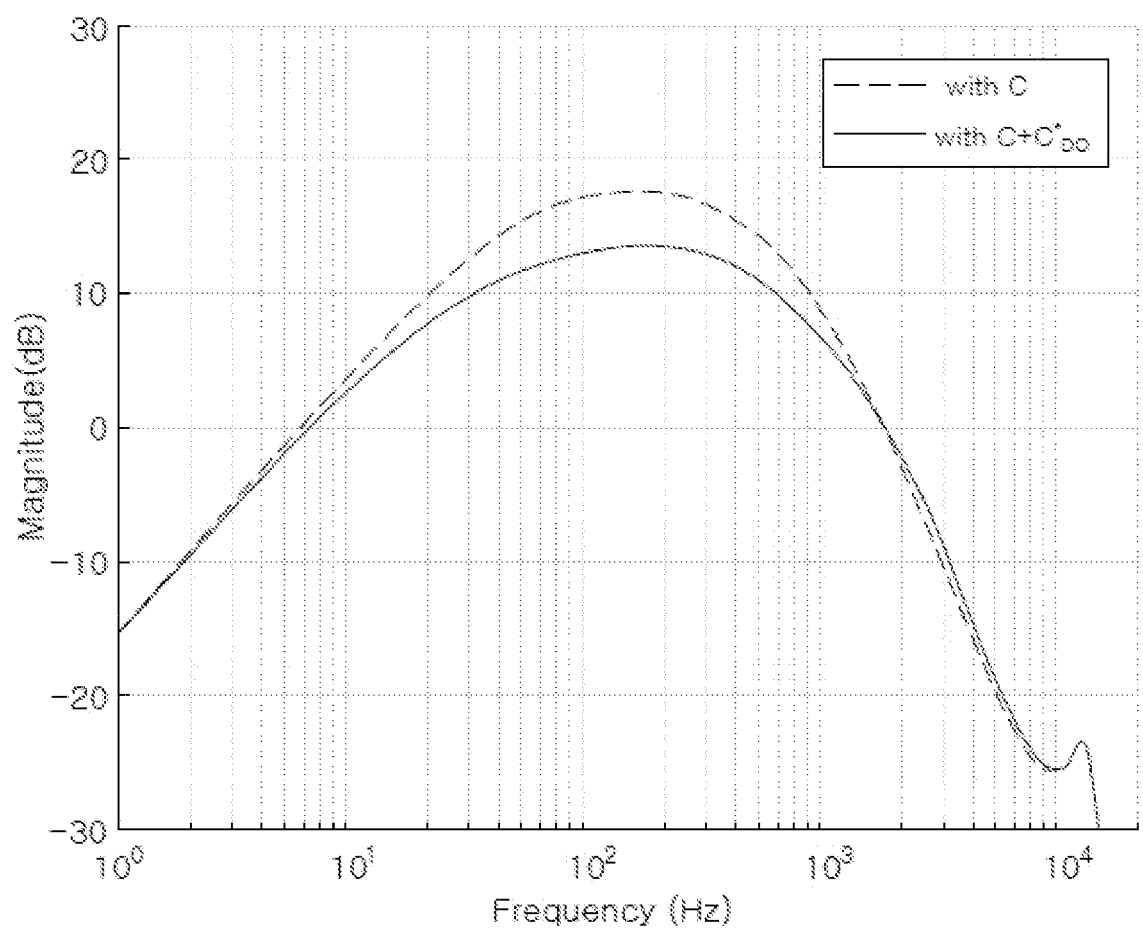
FIG. 6 is an exemplary view illustrating a torque transfer function according to an embodiment of the present disclosure.

Furthermore, as shown in FIGS. 5 and 6, it is seen that, in the case of the control system where the designed disturbance observer ($C^*_{DO}$) is combined with the controller C, performance against disturbances is improved in terms of sensitivity and a torque transfer function.

As an embodiment, in order to verify the control system according to the present disclosure, the output of the plant was observed after inputting the disturbance as in Equation 8 below to the control system.

$$w(t)=\sin(2\pi 50t)+0.5\sin(2\pi 500t)+0.3\sin(2\pi 10000t) \quad [\text{Equation 8}]$$

Figure 7A:
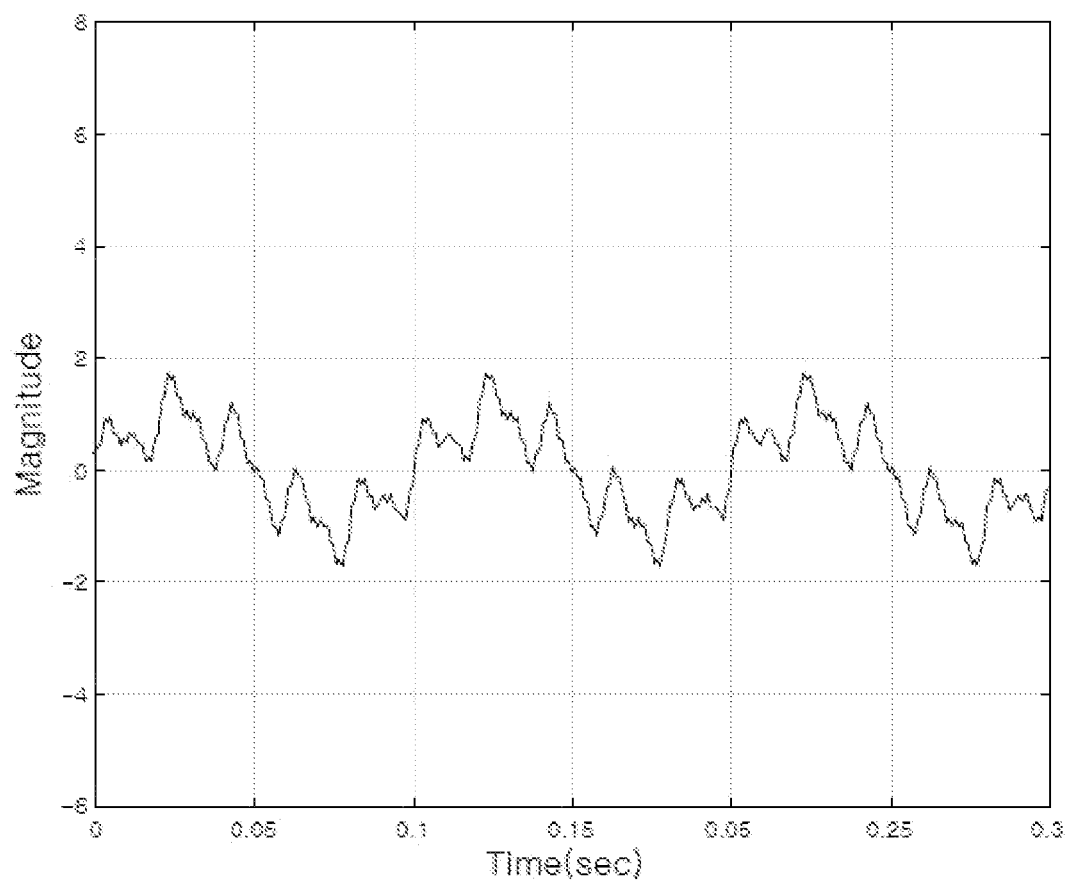
FIGS. 7A to 7C are exemplary views illustrating an output of the plant in response to a disturbance input according to an embodiment of the present disclosure.
Figure 7B:
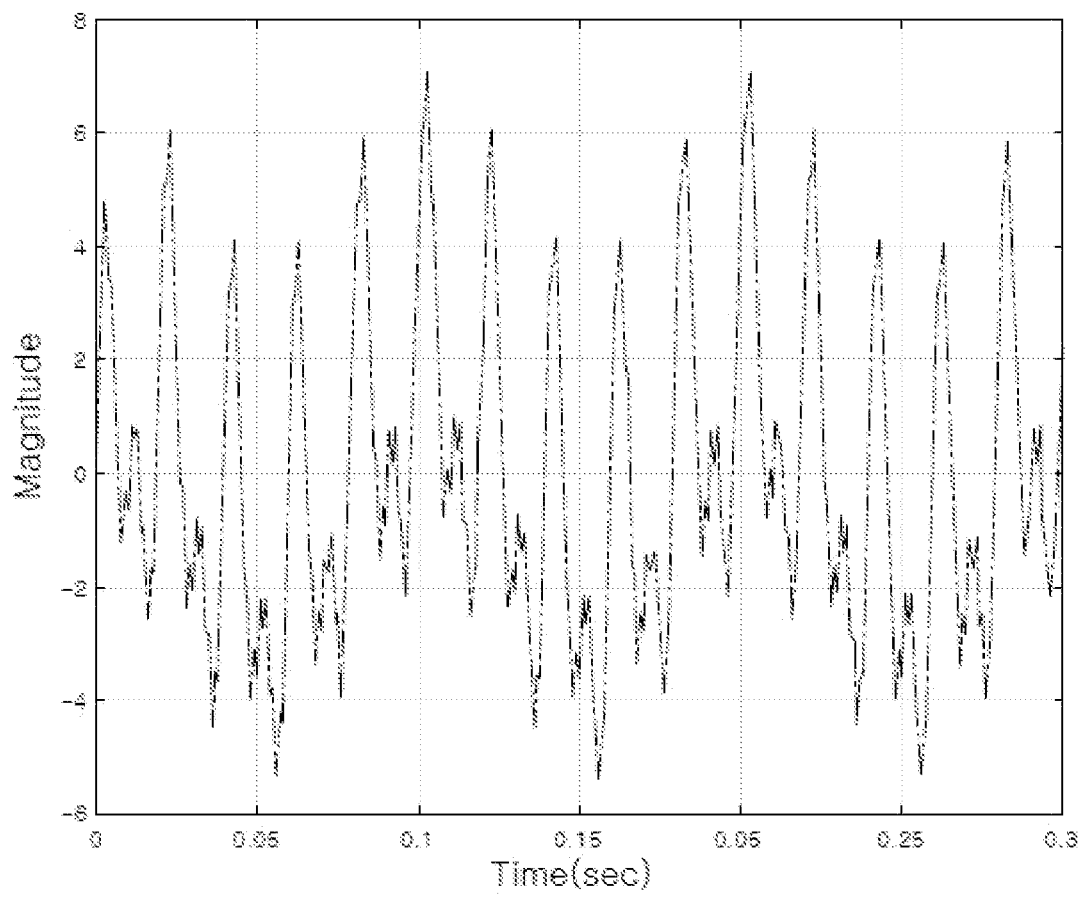
Figure 7C:
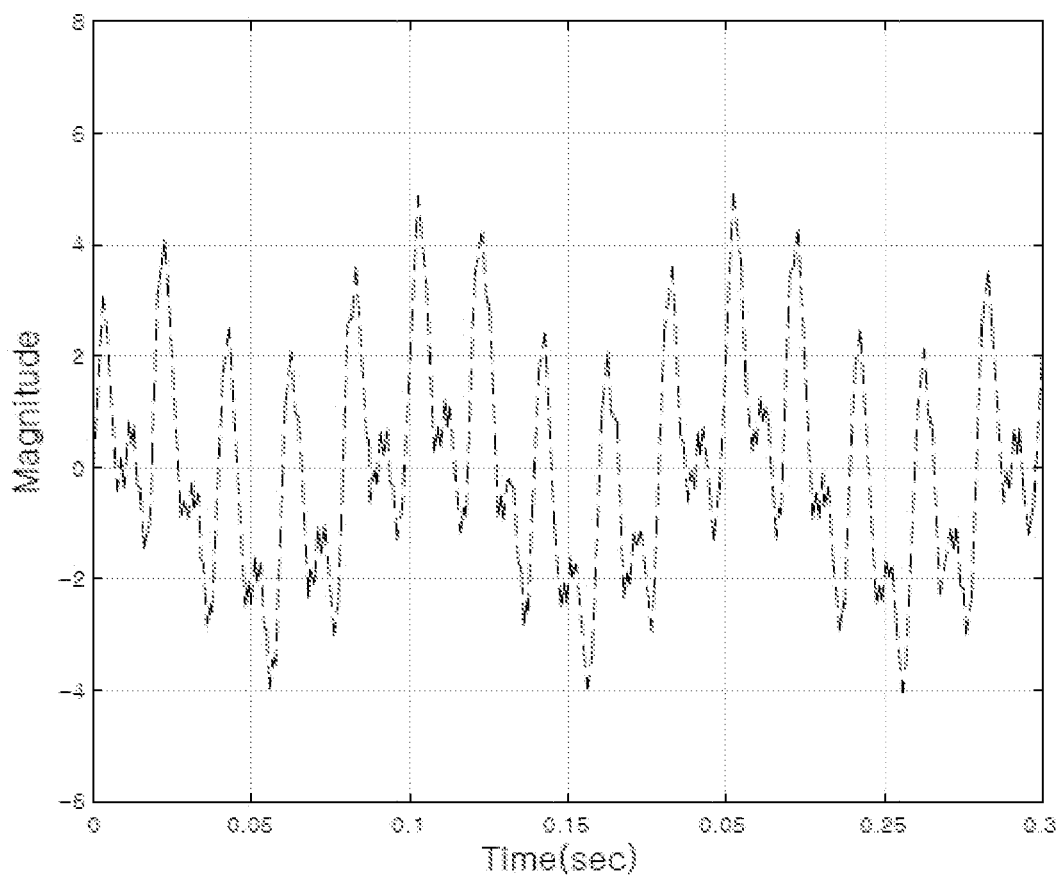

As shown in FIGS. 7A to 7C, it is seen that the control system including the disturbance observer is less affected by the disturbance than the control system without it.

On the other hand, since disturbances can occur in various frequency bands, it is necessary to check whether the control system has stability even for disturbances having a full range of frequency components.

Figure 8:
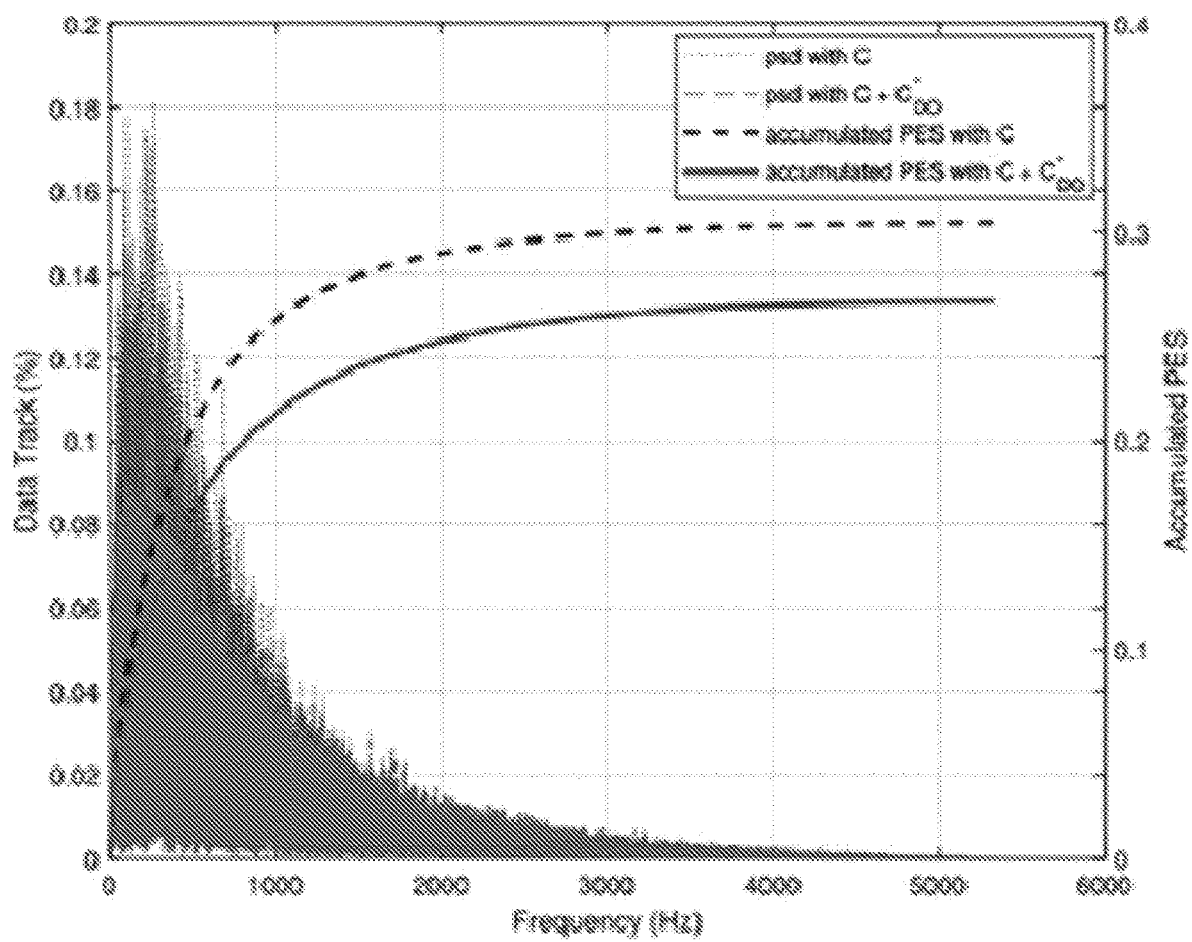
FIG. 8 is an exemplary view for comparing power spectrums and accumulated position error signals according to an embodiment of the present disclosure.

To be specific, as shown in FIG. 8, by analyzing the output of the plant P to be controlled after applying a random disturbance to the control system, a change in output caused by disturbances was observed. It is seen that, when the designed disturbance observer is applied, the disturbance has less influence and the performance is improved by approximately 10% when comparing the accumulated position error signal (PES).

Figure 9:
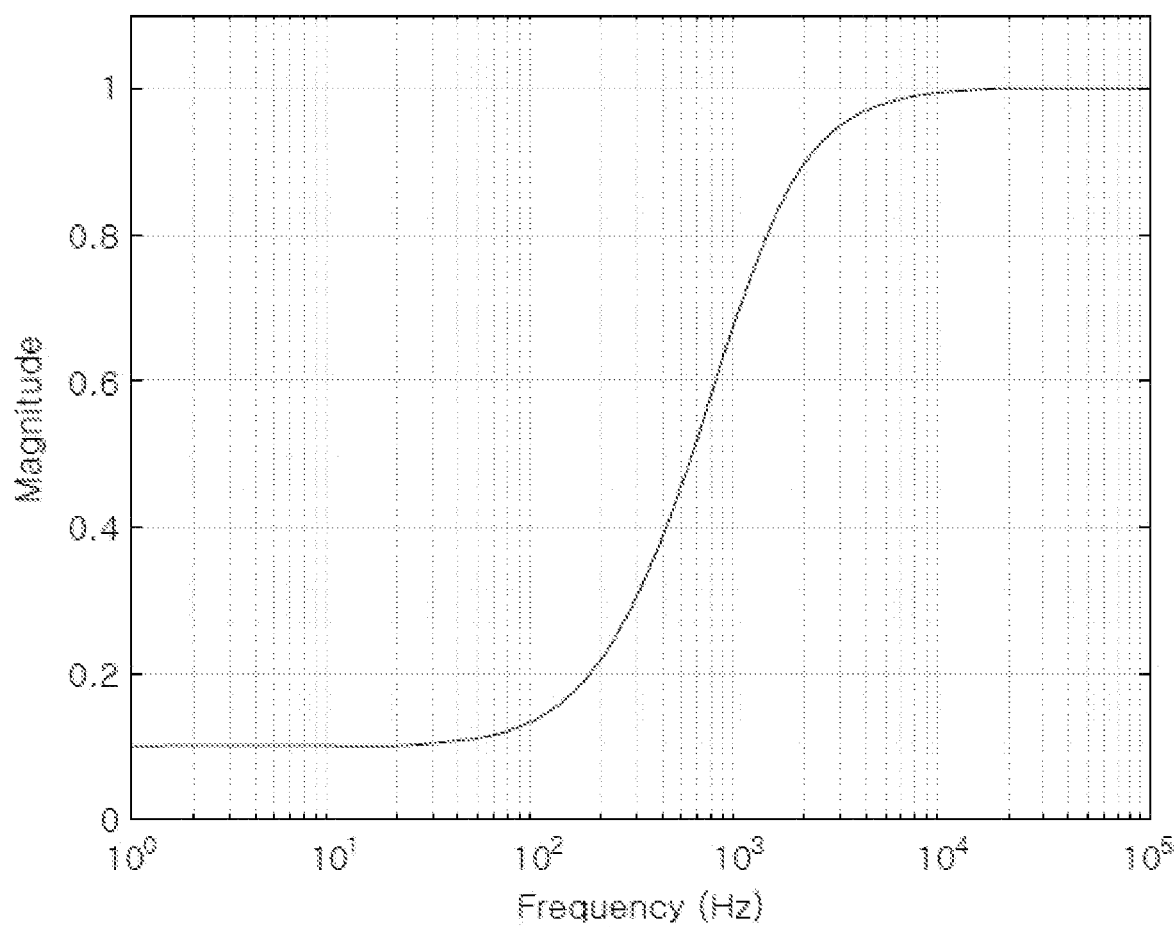
FIG. 9 is an exemplary view for explaining a region of uncertainty of a controlled model according to an embodiment of the present disclosure.

In the meantime, it is also necessary to analyze the influence of uncertainty of the plant caused by errors in the manufacturing process. In general, control systems that are actually applied have almost no error in a low-frequency region, and have more errors in a high-frequency region so that uncertainty thereof increases. Therefore, as shown in FIG. 9, the plant to be controlled was designed, seeking the control system having an error of 10% in the low-frequency region (100 Hz or less) and an error of 100% in the high frequency region (1 KHz or more).

Figure 10:
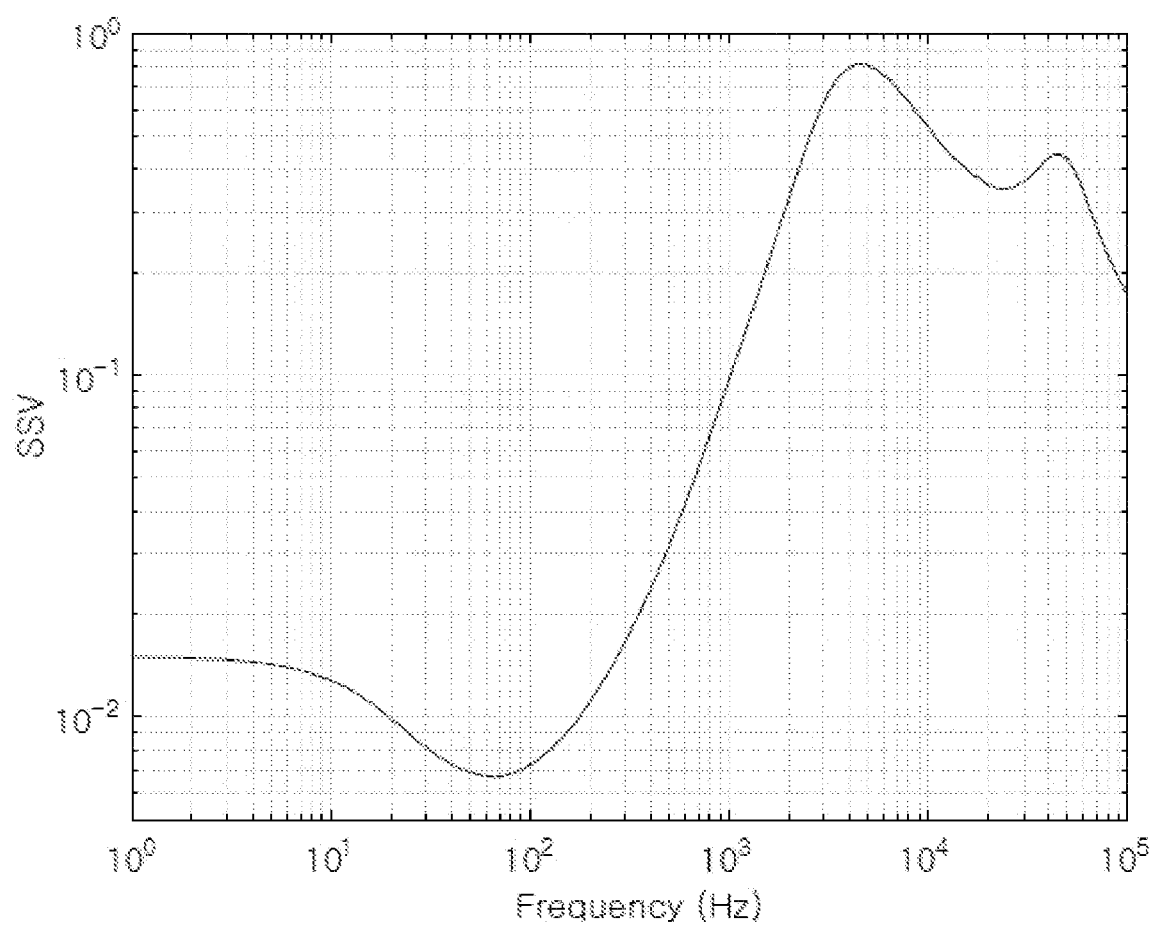
FIG. 10 is an exemplary view for explaining robustness of a controlled model according to an embodiment of the present disclosure.

In this case, as shown in FIG. 10, it is seen that the control system may have robustness in the entire frequency domain. Specifically, when the y-axis (SSV) on the graph in FIG. 10 has a value greater than $10^0$ (=1), the robustness does not materialize. However, since the control system according to an embodiment of the present disclosure may not exceed this limit in the entire frequency domain, it may be possible to build a robust control system against errors occurring in the manufacturing process.

Consequently, when using the control system designed according to an embodiment of the present disclosure, it may be possible to secure the ability to eliminate disturbances, to solve the problem of not having robustness due to errors in the manufacturing process, and to keep a closed-loop system stable at all times.

Figure 11:
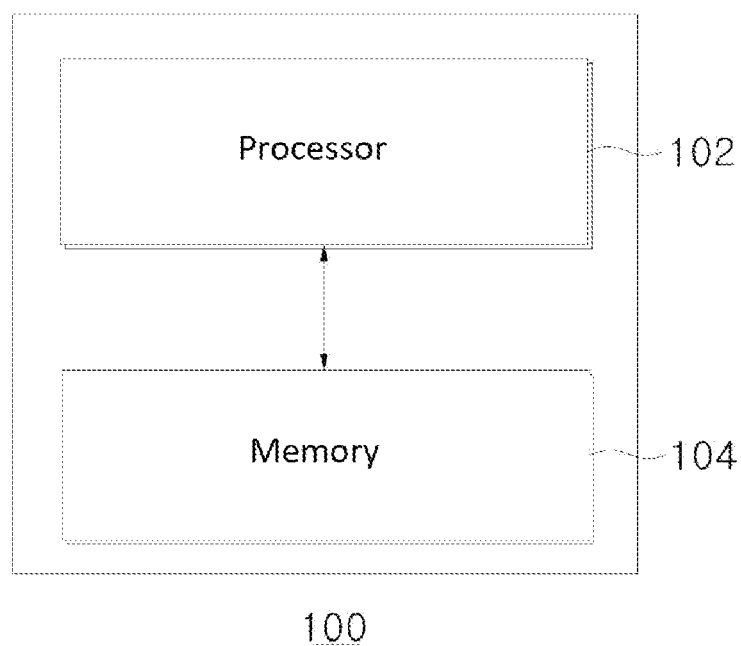
FIG. 11 is a block diagram showing a device according to an embodiment of the present disclosure.

FIG. 11 is a block diagram showing a device according to an embodiment of the present disclosure.

A processor 102 may include one or more cores (not shown) and a graphic processing unit (not shown) and/or a connection path (e.g., a bus) for transmitting and receiving signals to and from other components.

The processor 102 according to an embodiment of the present disclosure may execute one or more instructions stored in a memory 104 to implement the method described in connection with the above-mentioned disclosure.

On the other hand, the processor 102 may further include a random-access memory (RAM; not shown) and a read-only memory (ROM; not shown) that temporarily and/or permanently store signals (or data) processed in the processor 102. In addition, the processor 102 may be in the form of a system on chip (SoC) including at least one of a graphic processing unit, RAM, and ROM.

Programs (one or more instructions) for processing and controlling the processor 102 may be stored in the memory 104. The programs stored in the memory 104 may be divided into a plurality of modules by function.

Steps of the method or the algorithm that has been described in relation to the embodiments of the present disclosure may be implemented directly by hardware, implemented by a software module executed by the hardware, or implemented by a combination thereof. The software module may reside in a random-access memory (RAM), a read-only memory (ROM), an erasable programmable ROM (EPROM), an electrically erasable programmable ROM (EEPROM), a flash memory, a hard disk, a removable disk, a CD-ROM, or any form of computer readable recording media well known in the technical field to which the present disclosure pertains.

The components of the present disclosure may be provided in the form of a program (or application) to be executed in combination with a computer, which is hardware, and stored in a medium. The components of the present disclosure may be executed by software programming or software elements, and, similarly, the embodiments of the present disclosure may include various algorithms in the form of combinations of data structures, processes, routines, or other programming components and may be implemented in programming or scripting languages such as C, C++, Java, and Assembly. The functional aspects may be carried out by an algorithm running on one or more processors.

Although the embodiments of the present disclosure have been described with reference to the accompanying drawings, a person having ordinary skills in the technical field to which the present disclosure belongs will be able to understand that the present disclosure can be embodied in other specific forms without changing its technology or essential features. Therefore, it should be understood that the embodiments described above are illustrative in all respects and not restrictive.

There may be provided the system including the robust optimal disturbance observer for high-precision position control performed by the electronic device according to an aspect of the present disclosure for achieving the above-mentioned purpose, including: the plant P to be controlled; the controller C; the first weight function W1; the second weight function W2; and the disturbance observer, wherein the first weight function W1 may receive a difference value between a disturbance w and an output $u_{DO}$ of the disturbance observer as an input value, the second weight function W2 may receive a difference value between an output value of the controller C and the output $u_{DO}$ of the disturbance observer as an input value, the plant P to be controlled may receive, as an input value, a sum value of the disturbance w and the difference value between the output value of the controller C and the output $u_{DO}$ of the disturbance observer, and the controller C may receive an output value of the plant P to be controlled as an input value.

What is claimed is:

1. A system comprising a robust optimal disturbance observer for high precision position control performed by an electronic device, comprising:
    a plant P to be controlled;
    a controller C;
    a first weight function W1;
    a second weight function W2; and
    a disturbance observer, wherein
        the first weight function W1 receives a difference value between a disturbance w and an output $U_{DO}$ of the disturbance observer as an input value,
        the second weight function W2 receives a difference value between an output value of the controller C and the output $U_{DO}$ of the disturbance observer as an input value,
        the plant P to be controlled receives, as an input value, a sum value of the disturbance W and the difference value between the output value of the controller C and the output $U_{DO}$ of the disturbance observer, and
        the controller C receives an output value of the plant P to be controlled as an input value, wherein
            the first weight function W1 is a weight function for minimizing the difference between the applied disturbance w and the output $U_{DO}$ of the disturbance observer based on the frequency characteristics of the plant P to be controlled,
            the second weight function W2 is a weight function for controlling the uncertainty of the plant P to be controlled, and
            the disturbance observer is formed based on the first weight function W1 and the second weight function W2.

2. The system of claim 1, wherein the plant P to be controlled, the controller C, the first weight function W1, and the second weight function W2 are expressed by a state space expression as in Equation 1 below, and a state equation of the plant P to be controlled is expressed as in Equation 2 below.

$$P: \begin{array}{l} \dot{x}_P(t) = A_P x_P(t) + B_P u_P(t) \\ y_P(t) = C_P x_P(t) \end{array} \qquad \text{[Equation 1]}$$

$$C: \begin{array}{l} \dot{x}_C(t) = A_C x_C(t) + B_C u_C(t) \\ y_C(t) = C_C x_C(t) + D_C u_C(t) \end{array}$$

$$W_1: \begin{array}{l} \dot{x}_{W_1}(t) = A_{W_1} x_{W_1}(t) + B_{W_1} u_{W_1}(t) \\ y_{W_1}(t) = C_{W_1} x_{W_1}(t) + D_{W_1} u_{W_1}(t) \end{array}$$

$$W_2: \begin{array}{l} \dot{x}_{W_2}(t) = A_{W_2} x_{W_2}(t) + B_{W_2} u_{W_2}(t) \\ y_{W_2}(t) = C_{W_2} x_{W_2}(t) + D_{W_2} u_{W_2}(t) \end{array}$$

$$\begin{aligned} \dot{x}_P(t) &= A_P x_P(t) + B_P u_P(t) \qquad \text{[Equation 2]} \\ &= A_P x_P(t) + B_P u_P(t) + C_C x_C(t) + \\ &\quad D_C C_P x_P(t) - u_{DO}(t)) \\ &= (A_P + B_P D_C C_P) x_P(t) + B_P C_C x_C(t) + \\ &\quad B_P w(t) - B_P u_{DO}(t). \end{aligned}$$

3. The system of claim 2, wherein a state equation of the controller C is expressed as in Equation 3 below.

$$\begin{aligned} \dot{x}_C(t) &= A_C x_C(t) + B_C u_C(t) \qquad \text{[Equation 3]} \\ &= A_C x_C(t) + B_C C_P x_P(t) \\ &= B_C C_P x_P(t) + A_C x_C(t). \end{aligned}$$

4. The system of claim 2, wherein state equations of the first weight function W1 and the second weight function W2 are expressed as in Equation 4 below.

$$\begin{aligned} \dot{x}_{W_1}(t) &= A_{W_1} x_{W_1}(t) + B_{W_1}(w(t) - u_{DO}(t)) \qquad \text{[Equation 4]} \\ &= A_{W_1} x_{W_1}(t) + B_{W_1}\left(w(t) - B_{W_1} u_{DO}(t)\right) \end{aligned}$$

$$\begin{aligned} \dot{x}_{W_2}(t) &= A_{W_2} x_{W_2}(t) + B_{W_2}(C_C x_C(t) + D_C C_P x_P(t)) - u_{DO}(t)) \\ &= A_{W_2} x_{W_2}(t) + B_{W_2}(C_C x_C(t) + D_C C_P x_P(t)) - B_{W_2} u_{DO}(t)) \\ &= B_{W_2} D_C C_P x_P(t) + B_{W_2} C_C x_C(t) + A_{W_2} x_{W_2}(t) - B_{W_2} u_{DO}. \end{aligned}$$

5. The system of claim 4, wherein an output value z1 of the first weight function W1 and an output value z2 of the second weight function W2 are expressed as in Equation 5 below.

$$\begin{aligned} z_1(t) &= C_{W_1} x_{W_1}(t) + D_{W_1}(w(t) - u_{DO}(t)) \qquad \text{[Equation 5]} \\ &= C_{W_1} x_{W_1}(t) + D_{W_1} w(t) - D_{W_1} u_{DO}(t)), \end{aligned}$$

$$\begin{aligned} z_2(t) &= C_{W_2} x_{W_2}(t) + D_{W_2}(C_C x_C(t) + D_C C_P x_P(t) - u_{DO}(t)) \\ &= C_{W_2} x_{W_2}(t) + D_{W_2} C_C x_C(t) + D_{W_2} D_C C_P x_P(t) - D_{W_2} u_{DO}(t) \\ &= D_{W_2} D_C C_P x_P(t) + D_{W_2} C_C x_C(t) + C_{W_2} x_{W_2}(t) - D_{W_2} u_{DO}. \end{aligned}$$

* * * * *